Oct. 14, 1924.
R. P. CHAMPNEY ET AL
1,511,396
DRIVING BELT
Original Filed Nov. 4, 1921
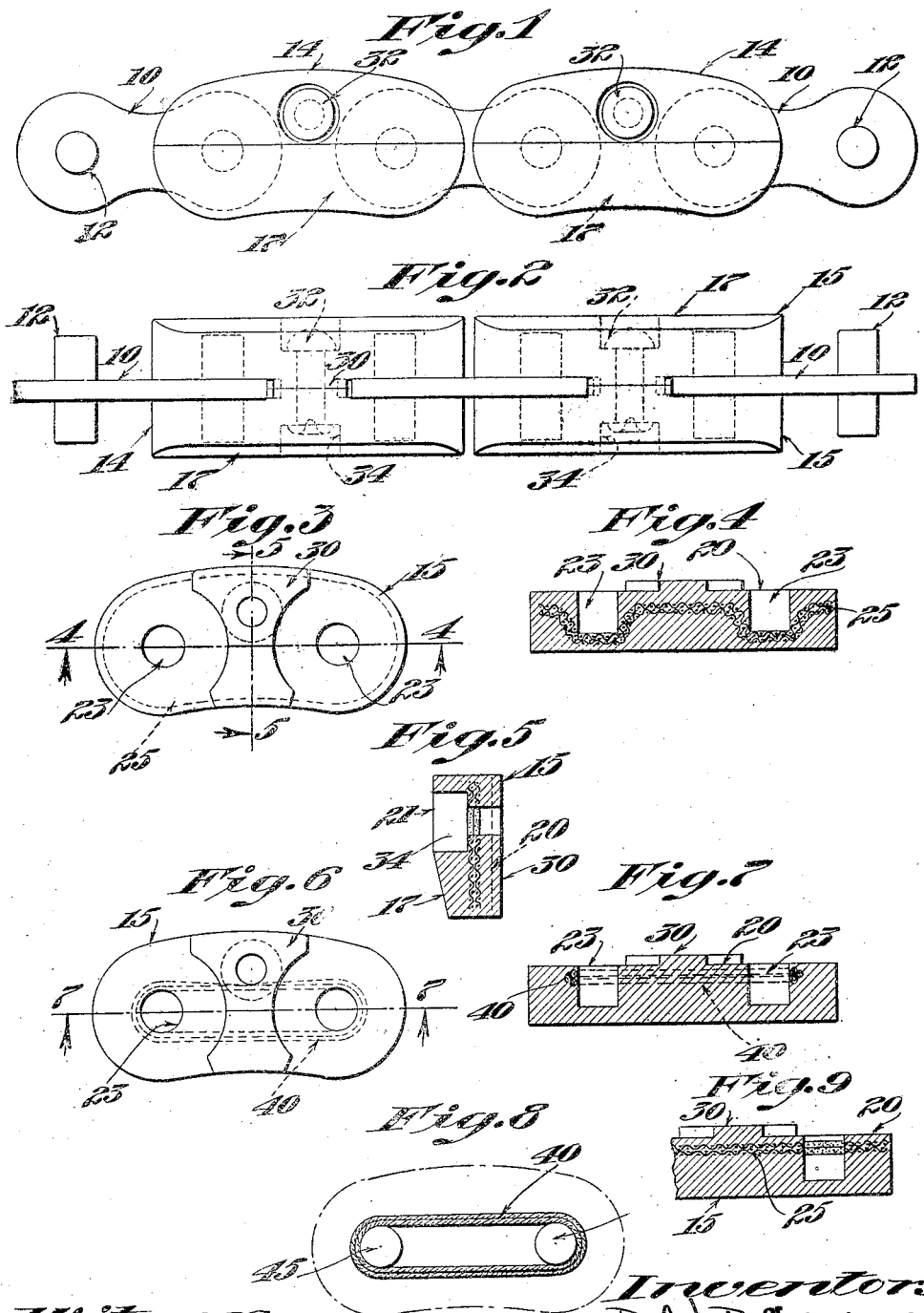

Patented Oct. 14, 1924.

1,511,396

UNITED STATES PATENT OFFICE.

RALPH P. CHAMPNEY, OF WORCESTER, AND F. ROBINS MITCHELL, OF WESTON, MASSACHUSETTS.

DRIVING BELT.

Application filed November 4, 1921, Serial No. 512,712. Renewed March 14, 1924.

*To all whom it may concern:*

Be it known that we, RALPH P. CHAMPNEY and F. ROBINS MITCHELL, citizens of the United States, residing at Worcester, in the county of Worcester and Commonwealth of Massachusetts, and Weston, in the county of Middlesex and Commonwealth of Massachusetts, respectively, have invented certain new and useful Improvements in Driving Belts; and we do hereby declare the following to be a full, clear, and exact description of the invention, such as will enable others skilled in the art to which it appertains to make and use the same.

The present invention relates to driving belts and more particularly to driving belts of the type employed in operating generators, fans, and similar appurtenances such as are commonly embodied in motor vehicles.

This general type of belt is disclosed in the patent to Champney, No. 1,282,189, October 22, 1918, and comprises a series of metal links which alternate with a series of composite friction links. The friction links comprise links of fibre or similar material faced with blocks of leather or other friction material and with spacer members interposed between the opposite sides of the links and lying between the ends of adjacent metal links. The opposite faces of these composite links are V-shaped in cross section to fit between and grip similarly inclined faces upon driving and driven pulleys. In belts of this type the fibre links have sometimes been replaced by metal links where it is desired to transmit a greater strain. This is objectionable, however, as the metal links compel a metal to metal connection which wears rapidly and accordingly this type of belt from the standpoint of wearing quality is not so practical as a belt employing links of fibre or similar material which cooperate with the intermediate metal links to provide a non-metallic pivot joint.

It will be obvious to those skilled in the art that each of these composite links comprises a considerable number of separate parts which must be properly formed and assembled to complete the belt and that, in addition, the fibre or other links must be amply strong to transmit the desired strain and at the same time capable of operating for considerable periods of time without substantial wear. As a practical matter, it is exceedingly difficult to obtain fibre which will transmit the driving strains, especially where the belt is subjected to sudden shocks without cracking and breaking and causing failure of the belt. In addition, the cost of fabricating the several parts of the belt, together with the assembly of these parts into a completed belt, involves considerable time and expense and makes the cost of the completed belt correspondingly large.

It is the object of the present invention to produce a driving belt of this general type which is not only more efficient and will outwear previous belts, but, in addition, may be actually manufactured at a less cost than belts of this type heretofore developed.

With this object in view, one feature of the invention contemplates a link V belt having friction links, each of which consists of two molded rubber blocks of like form having pivot pin receiving apertures formed therein and spacing projections extending from the inner face between the ends, the blocks having embedded therein reinforcing material which extends around the pivot apertures to reenforce the apertures.

A belt having the friction links constructed in this manner has all of the desirable attributes of the belts previously made with some additional advantages not present in these belts, and, in addition, the five elements required for each composite link, as heretofore made, are reduced to two parts of identical form and shape.

In one simple form of the invention as now constructed, each molded rubber block has embedded therein a reenforce of flaccid material extending about the pivot pin apertures and completely vulcanized to the rubber block.

Still further features of the invention consist in certain novel features of construction, combinations and arrangements of parts hereinafter described and claimed, the advantages of which will be obvious to those skilled in the art from the following description.

In the accompanying drawings illustrating the preferred form of the invention, Figure 1 represents a side elevation of a link V belt of the type to which the present invention pertains; Fig. 2 is a bottom plan view of the belt shown in Fig. 1; Fig. 3 is a detail illustrating a side elevation of one of the molded rubber blocks with a layer of reenforcing fabric embedded therein; Fig. 4 is a cross section on the line 4—4 of the block shown in Fig. 3, illustrating the manner in which the reenforcing layer of fabric surrounds the pivot pin apertures; Fig. 5 is a section upon the line 5—5 of Fig. 3, illustrating the position of the reenforcing fabric with respect to the fastener aperture; Fig. 6 is a view of the rubber block illustrating a modified form of reenforcement in the shape of a cord extending lengthwise of the block and passing about the pivot pin apertures; Fig. 7 is a cross section of the block shown in Fig. 6, taken upon the line 7—7 of Fig. 6; Fig. 8 is a diagrammatic view of a portion of the mold illustrating the manner in which the reenforcing cord may be wrapped about the pins in the mold prior to the formation and vulcanizing of the rubber blocks; and Fig. 9 is a view of a slightly different construction from that shown in Fig. 4 in which the reenforcing fabric is previously punched.

The driving belt, specifically illustrated, comprises a series of metal links 10, having oppositely projecting metal pivot pins 12 which are connected with friction links indicated generally at 14, these friction links having apertures adapted to receive the pivot pins 12 formed upon opposite ends of the metal links. According to the present invention, each of the friction links comprises two blocks 15 of identical size and form and molded of rubber or similar composition. The outer or opposite faces of the blocks are beveled at 17 to engage with similarly inclined faces upon the driving and driven pulleys. It will be obvious to those skilled in the art that these friction links consisting of the two blocks 15 must be sufficiently strong to transmit the desired driving strains without rupturing the blocks even when subjected to sudden shocks due to accelerating the speed. In addition, the blocks must be sufficiently pliable or compressible to engage and frictionally grip the faces of the pulleys to transmit the desired tractive effort. These results are accomplished with the molded rubber blocks of the present invention which are designed in such a manner that ample strength is afforded, while at the same time the frictional engagement between the belt and the pulleys is increased. In addition, this type of link actually withstands sudden driving shocks or strains in a better manner than links composed of fibre or similar material as the imposition of such a strain may cause a slight stretching or yielding of the links without cracking or breaking them.

Referring to Figs. 3 to 5 inclusive, it will be observed that each of the rubber blocks 15 consists of a link shaped member having a plane inner face 20 and an outer face having a straight upper portion 21 parallel with the inner face and a lower bevelled portion 17, as previously described. Each of these blocks has pivot pin apertures 23 molded therein adjacent opposite ends, the apertures extending from the inner face substantially more than half way through the thickness of the block, in order to afford the greatest possible bearing for the pivot pins 12. Extending through the interior of the block from end to end and completely vulcanized therein, is a reenforcing layer 25 of fabric or similar material which is amply heavy to reenforce the block and the pivot pin apertures. The main body of this fabric is positioned nearer the inner face 20 than the outer face 21, the fabric being depressed adjacent the apertures 23 by the aperture forming pins employed in the molds in a manner which will be obvious to those skilled in the art. With this construction it will be observed that the fabric completely surrounds each of the apertures 23 and the strength of the fabric is not impaired by the necessity of piercing it with holes adjacent the ends. Each of the blocks is provided with a spacer projection 30 extending from the inner face and of a thickness which approximates half the thickness of each of the metal links 10, the spacer members upon opposite blocks serving to form a complete spacer member filling the space between the ends of adjacent metal links as indicated in Figs. 1 and 2. Each of the blocks is also provided midway of its ends and adjacent the top with a rivet or other fastener recess extending completely therethrough, and adapted to receive a rivet or similar fastener 32, as shown in the drawings. This fastener opening in the block is countersunk as at 34 to receive the headed ends of the rivet, as indicated. A friction link consisting of blocks made in this manner is amply strong to withstand the driving strain and of a character to resist undue wear upon the pivot pin apertures. In addition, the character of the block is such that the desired frictional engagement between the bevelled faces of the friction links and the faces of the pulley are secured.

An alternative form of construction is shown in Figs. 6 and 7. In this construction, the layer of fabric reenforce 25 is replaced by a length of vulcanizing cord 40 extending throughout the length of the block and about the apertures 23, this cord serving to reenforce the block together with the apertures in a manner similar to the fabric 25. As will be observed, the cord may consist of an endless closed loop or several turns of cord passed about the apertures in the manner indicated. This cord may be simply incorporated in each of the rubber blocks as indicated diagrammatically in Fig. 8. In this figure the lower portion of the cavity mold is shown with the usual pins 45 for forming the apertures. Prior to the introduction of the rubber composition the reenforcing cord 40 is wrapped about the pins of the mold and thereafter when the rubber composition is placed in the mold and the latter is closed, the cord will be vulcanized in the interior of the block, as indicated. If it is desired to insure the retention of the cord in place adjacent the inner face of the rubber block, as shown in Fig. 7, it may be advisable to make the block in two parts by first laying a chunk of rubber in the mold around the pins, thereafter wrapping the cord in place, and finally placing a second chunk of rubber over the cord and vulcanizing in the usual manner. If so desired the reenforcing layer of fabric 25 may be provided with openings formed therein in order that the fabric may surround the pivot pin apertures in the manner indicated in Fig. 9. Such a construction offers a better bearing for the pivot pins than the construction shown in Fig. 4 and if the openings are formed in the proper manner or a knitted fabric is employed the strength will not be substantially impaired, especially when the fabric is molded in the rubber block.

While it is preferred to employ the specific construction and arrangement of parts illustrated and described, it is to be understood that this construction and arrangement is not essential except so far as specified in the claims and may be changed or modified without departing from the broader features of the invention.

What is claimed is:

1. A driving belt comprising metal links, pivot pins projecting from the metal links, friction links alternating with the metal links, the friction links consisting of two molded rubber blocks of like form, each having pivot pin apertures formed therein and a spacing projection extending from the inner face and a reenforcement embedded in the block and extending about the pivot pin apertures.

2. A driving belt comprising metal links, pivot pins projecting from the metal links, molded rubber blocks connected with the pivot pins and each having pivot pin apertures, and spacing projections midway between its ends and a reenforcement of flaccid material embedded within the block and extending about the apertures.

3. A driving belt comprising a molded rubber block having pivot pin apertures formed therein and extending part way through the block, and a layer of fabric reenforcement embedded within the block and vulcanized thereto and extending lengthwise of the block and about the pivot pin apertures.

4. A driving belt comprising metal and friction links alternating with one another, each of the friction links consisting of two molded rubber blocks of like form having complemental spacing projections extending from their inner faces and cooperating to form a spacer member approximating the thickness of the metal links and having their inner faces bevelled to frictionally engage with the faces of the pulley.

5. A driving belt comprising a molded rubber block having pivot pin apertures formed therein and extending part-way through, and a reenforcing layer of knitted fabric embedded in the block and having openings registering with the pivot pin apertures in the block.

RALPH P. CHAMPNEY.
F. ROBINS MITCHELL.